(12) United States Patent
Rigneault et al.

(10) Patent No.: US 8,223,343 B2
(45) Date of Patent: Jul. 17, 2012

(54) INTERFEROMETRIC CONFOCAL MICROSCOPE

(75) Inventors: Hervé Rigneault, La Ciotat (FR);
Nicolas Sandeau, Plan de Cuques (FR);
Hugues Giovannini, Allauch (FR)

(73) Assignees: Centre National de la Recherche Scientifique—CNRS, Paris (FR);
Universite Paul Cezanne—Aix Marseille III, Aix-en-Provence (FR)

( * ) Notice: Subject to any disclaimer, the term of this patent is extended or adjusted under 35 U.S.C. 154(b) by 639 days.

(21) Appl. No.: 12/304,238

(22) PCT Filed: May 30, 2007

(86) PCT No.: PCT/FR2007/000898
§ 371 (c)(1),
(2), (4) Date: Jun. 26, 2009

(87) PCT Pub. No.: WO2007/141409
PCT Pub. Date: Dec. 13, 2007

(65) Prior Publication Data
US 2009/0273791 A1 Nov. 5, 2009

(30) Foreign Application Priority Data

Jun. 8, 2006 (FR) ...................... 06 05087

(51) Int. Cl.
*G01B 11/02* (2006.01)
(52) U.S. Cl. ...................................... 356/511
(58) Field of Classification Search .................. 356/489, 356/495, 511, 512; 359/370
See application file for complete search history.

(56) References Cited

U.S. PATENT DOCUMENTS

| 5,257,089 A | 10/1993 | Stetson |
| 6,721,094 B1 * | 4/2004 | Sinclair et al. ................ 356/450 |
| 2003/0230710 A1 * | 12/2003 | Wolleschensky et al. .... 250/234 |

FOREIGN PATENT DOCUMENTS

EP 1 524 491 A1 4/2005

OTHER PUBLICATIONS

Dongkyun Kang, et al, "Lateral Resolution enhancement in confocal self-interference microscopy", Three-Dimensional and Multidimensional Microscopy: Image Acquistion and Processing XII, Jan. 26, 2005, pp. 152-163, vol. 5701, San Jose, CA, USA.

* cited by examiner

*Primary Examiner* — Michael A Lyons
(74) *Attorney, Agent, or Firm* — Arent Fox LLP (57) ABSTRACT

The invention concerns a confocal microscope for imaging a sample comprising at least a light source, said microscope comprising at least an objective and a tube lens with an image focus, said microscope comprising interference means constructed to generate interference figures from said light source, characterized in that said interference means comprising first image generation means constructed to generate a first image of said light source, second image generation means constructed to generate a second image of said light source symmetrical to the first image relative to the image focus, image interference means constructed to make said first image and said second image interfere.

14 Claims, 8 Drawing Sheets

INTERFEROMETRIC CONFOCAL MICROSCOPE

CROSS-REFERENCE TO RELATED APPLICATION

This application is a National Stage entry of International Application No. PCT/FR2007/000898, filed May 30, 2007, the entire specification claims and drawings of which are incorporated herewith by reference.

The present invention belongs to the technical field of confocal microscopes.

Confocal microscopes are known for collecting a luminescence emitted by a sample to be analysed. In such confocal microscopes, a sample to be analysed is placed in the focal plane of an objective. The luminescence emitted by the sample goes through an objective and a tube lens to a confocal hole to be connected at the level of a sensor. For a confocal microscope, the confocal hole is positioned at the image focus of the tube lens. In such known confocal microscopes, the luminescence is detected on the whole sample either by moving the sample or by moving the observation area. The luminescence of the sample is for example emitted by excitation by a laser beam in the case of the fluorescence. In this case, a dichroic mirror is positioned in the confocal microscope to splitter the fluorescence emitted by the sample and the light emitted by the laser.

One of the main problems in known confocal microscopes is the limitation of the spatial resolution which can be obtained when analysing samples.

In a way known per se, the spatial resolution in such a confocal microscope can be broken down into a first part resulting from the laser excitation and a second part resulting from the collection at the level of the confocal hole.

As a matter of fact, it should be understood firstly that the excitation by a laser defines a focusing zone which is not totally point-shaped and has a certain resolution. The area wherein the laser intensity is at a maximum thus defines a volume, also called an excitation volume.

In addition, the image of the confocal hole through the microscope limits the volume of observation of the excited fluorescent molecules. This volume is called a collection volume.

The spatial resolution of a confocal microscope is then a function of the volume of observation, the product of the excitation volume by the collection volume.

In order to improve more particularly the excitation volume in an axial direction, confocal microscopes are known which are also called 4π-microscopes and have for example been disclosed in the application for the European patent EP 0491289. In such a 4π-microscope, two objectives are constructed so as to have their focal planes at the level of the object to be imaged. In such a device, a real source point which is not located exactly in the focal plane of the objectives but shifted by a distance d on one objective side interferes with a virtual source point symmetrical to the real source point relative to the focal plane of the objectives. Such two consistent source points interfere in a destructive way at the level of the confocal hole. Thus, only the source points located at the level of the focal plane of the two objectives will not generate destructive interferences, so that it is possible to improve the axial resolution of the microscope.

Such a 4π-microscope thus defines a confocal microscope for imaging a light source, said microscope comprising at least one objective and one tube lens having an image focus, said microscope comprising interference means constructed to generate interference figures from said light source.

In the case of the 4π-microscope, both interferometer arms are formed by both beams emitted by both objectives themselves.

However, such a double-confocal microscope has a certain number of drawbacks.

Firstly, it does not make it possible to improve the side resolution, i.e. perpendicularly to the optical axis, more particularly relative to a simple-confocal microscope. As a matter of fact within the 4π-microscope, the two arms formed between each of the objectives and the tube lens form two arms of an interferometric system. If a light source is shifted with respect to the focus of both objectives in a lateral direction, i.e. in the common focal plane of both objectives, both arms of the interferometer see the source at the same distance and generate two identical images emitted by this source. Such images thus interfere from the constructional point of view. Then, the side resolution of a 4π-microscope is not satisfactory.

In addition, using two objectives located so as to make the focal plans thereof coincide results in the fact that the device is difficult to align and to maintain under satisfactory alignment conditions. Such a device is in particular very sensitive to temperature.

In addition, the accurate positioning of the arms of the interferometer formed by the beams emitted by both objectives makes it impossible to search through the sample by moving the volume of observation. Then the dot analysis of the sample cannot be carried out but by moving the sample itself which is executed more slowly than moving the volume of observation.

In addition, as the objectives have a rather low working distance, only thin samples can be positioned between the two objectives of a 4π-microscope.

One object of the invention is thus to improve the side resolution in a confocal microscope.

Another object of the invention is to improve the side resolution by reducing the volume of detection in a confocal microscope.

Another object of the invention is to provide a confocal microscope having a good side and axial resolution and which is stable.

Another object of the invention is to provide a confocal microscope having a good side and axial resolution which is simple to use.

Another object of the invention is to provide a confocal microscope having a good side and axial resolution and which can measure fluorescence for relatively thick objects.

Another object of the invention is to provide a confocal microscope having a good side and axial resolution making it possible to observe a bioluminescent sample with a good sensitivity.

At least one of these goals is reached according to the invention, the object of which is a confocal microscope for imaging a sample comprising at least a light source, said microscope comprising at least an objective and a lens tube having an image focus, said microscope comprising interference means constructed to generate interference figures from said light source, wherein said interference means comprise first image generation means constructed to generate a first image of said light source, second image generation means constructed to generate the second image of said light source symmetrical to first image relative to the image focus, the image interference means constructed to make said first image and said second image interfere.

The interference means positioned in the confocal microscope according to the invention thus comprise first generation means for generating a first image and second generation means for generating a second image, the two images of the light source being symmetrical to each other relative to the image focus of the tube lens. Thus, when a real source is extended, more particularly because of the non point-shaped excitation by a laser, it comprises a side part shifted with respect to the object focal point of the objective in a direction perpendicular to the optical axis of the objective. According to the invention, such side part interferes in a destructive way with a side part of a virtual source symmetrical to the real light source relative to the focus of the objective. This interference system thus makes it possible to improve the side resolution of the microscope according to the invention.

It should be noted that in a 4π-microscope, interferences only occur in one direction along the axis of the objectives. Thus, the side part of an extended source, i.e. out of the optical axis of the objectives, will not generate interferences since it will be seen in the same way by both objectives. In a general way, for an extended source, more particularly because of the non point-shaped excitation by a laser, a 4π-microscope does not make it possible to generate two images of the sources symmetrical relative to the image focus of the tube lens.

More particularly, in the above-mentioned confocal microscope, said at least one objective has an optical axis, said light source having an axial component along said optical axis, and a side component perpendicular to said optical axis, and wherein said first image generation means are constructed to generate a first side image of said side component, said second image generation means are constructed to generate a second side image of said side component, said first side image and said second side image being symmetrical relative to said image focus, said image interference means being constructed to make said first side image and said second side image interfere.

In order to facilitate the utilisation of the microscope according to the invention and more particularly in order to make the functionality of improving the side resolution in the above-mentioned confocal microscope optional, said light source can be able to generate a light beam having at least a light path between said at least one objective and said lens and said interference means can be located between said objective and said tube lens on said light path.

Thus, for example, the interference means such as previously defined can be positioned in one of the arms of the 4π-microscope in order to improve the side resolution thereof.

In order to generate images symmetrical to the light source relative to the focus of the tube lens in the above-mentioned confocal microscope, said interference means can include a first reference arm formed by a beam splitter and a reference mirror and a second object arm formed by said beam splitter and a reflection optical system.

According to a first embodiment of the invention, said reflection optical system can comprise an interferometer lens and an object mirror.

According to a second embodiment of the invention, said reflection optical system comprises a tube corner.

In the above-mentioned microscope, said first image generation means can comprise said reference mirror, said second image generation means can comprise said reflexion optical system and said image interference means can comprise said beam splitter.

With such interference means, the reference arm does not modify the received light beam and the object arm generates an output beam symmetrical to the incident beam relative to the focus of the interferometer lens. Thus, at the level of the focus of the tube lens, the reference arm generates a first non-modified image of the light source, and the object arm generates a second image symmetrical to the first image relative to the focus of the tube lens.

The association of an interferometer lens and an object mirror or the use of a cube corner makes it possible to reflect an incident beam in a symmetrical way relative to a focus.

The above-mentioned confocal microscope may comprise a pump beam, said light source being composed of at least one fluorescent particle excited by said pump beam in an excitation area spatially focused at the output of said objective, said excited fluorescent particle being able to generate a fluorescence, said confocal microscope comprising separation means constructed to separate said pump beam and said fluorescence.

In one embodiment of the above-mentioned confocal microscope, the confocal microscope can comprise a single objective. The embodiment makes it possible to prevent the drawbacks related to the utilisation of a 4π-microscope which includes two objectives while providing a good side and axial resolution of the images obtained at the level of the sensor at the microscope output.

The invention object is also to provide a method for imaging a sample comprising at least one light source from at least one objective and a tube lens having an image focus, said method comprising a step of generation of interference consisting in generating interference figures from said light source,
wherein said step of generation of interference comprises sub-steps consisting in:
  generating a first image of said light source;
  generating a second image of said light source;
wherein said first image and said second image are symmetrical relative to said image focus;
  making said first image and said second image interfere.

According to a particular embodiment of the invention, said at least one objective has an optical axis, said light source having an axial component along said optical axis and a side component perpendicular to said optical axis and wherein said step of interference generation comprises sub-steps consisting in:
  generating a first side image of said side component,
  generating a second side image of said side component,
said first side image and said second side image being symmetrical relative to said image focus,
  making said first side image and said second side image interfere.

An embodiment of the invention will now be described while referring to the appended drawings, wherein:

In the figures, identical references refer to structurally similar elements.

Figure 1:
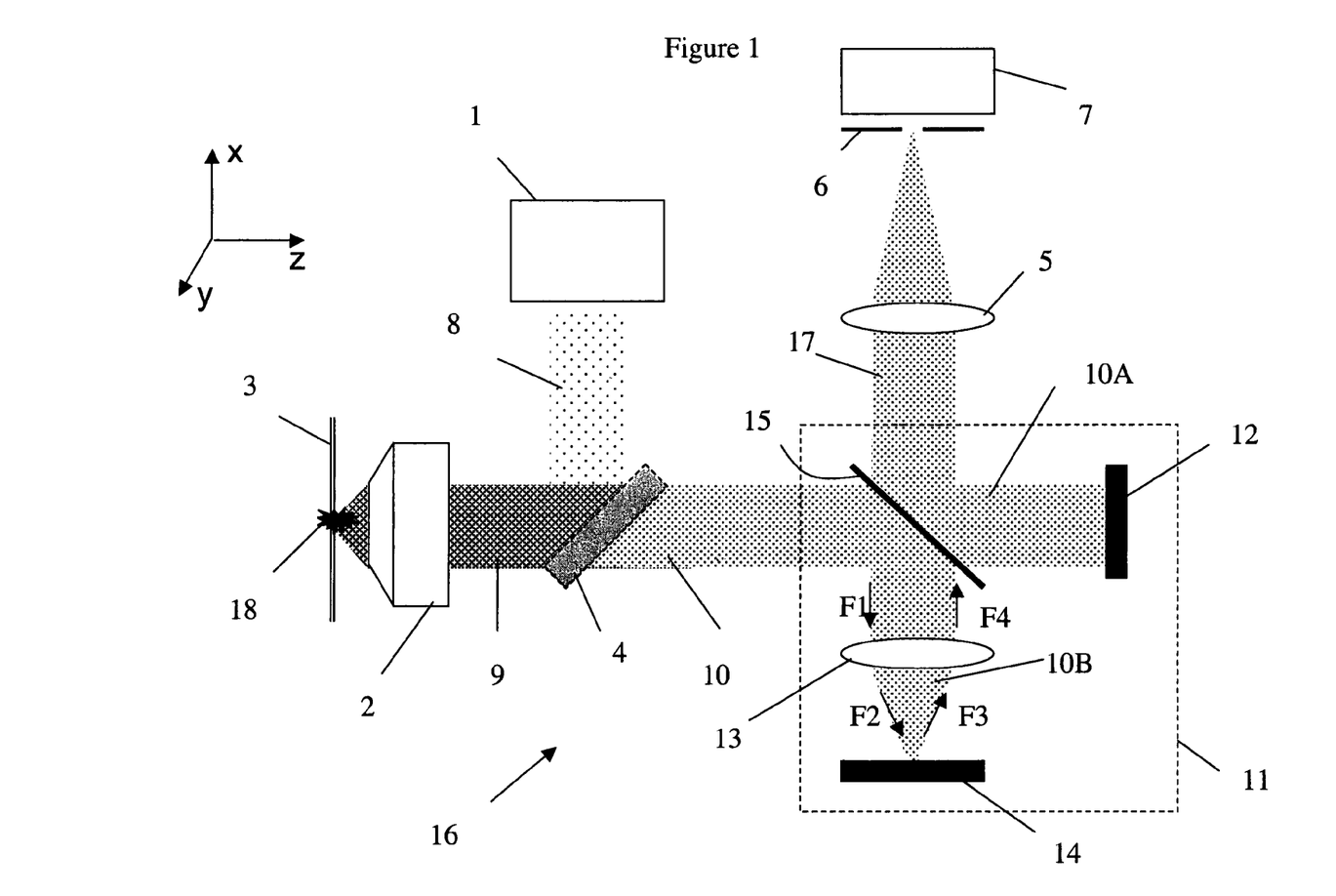
FIG. 1 represents a confocal microscope according to the invention.

FIG. 1 represents a confocal microscope 16 according to the invention.

The confocal microscope 16 according to the invention comprises an excitation laser 1 able to emit a laser beam 8 represented in FIG. 1 by low-density dots. This laser beam 8 is oriented towards a dichroic mirror 4 able to reflect the light beams and to splitter the beams according to their wavelengths. The dichroic mirror 4 reflects the laser beam 8 towards an objective 2. The objective 2 focuses the reflected laser beam towards a sample 3 comprising fluorescent particles 18. Under the laser excitation, the fluorescent particles 18 in turn generate a light beam which is re-emitted towards the objective 2. The light beam is transmitted by the objective 2 towards the dichroic mirror 4. The area between the dichroic mirror 4 and the sample 3 is thus a light beam area composed on the one hand by the light beam 8 emitted by the laser 1 at a first wavelength and by the light beam generated by the sample at the second wavelength. The resulting beam 9 is represented by high-density dots. The dichroic mirror is constructed to transmit the light beam emitted by the sample 3 and thus transmits the beam 10 comprising only the wavelength emitted by the sample 3, plus the laser wavelength. This beam 10 must be analysed by the microscope in order to determine the characteristic of the sample fluorescence 3.

According to the invention, this light beam 10 generated by a light source of the sample 3 is transmitted towards an interferometer 11. This interferometer 11 comprises a beam splitter 15 able to splitter the beam 10 into two beams 10A and 10B. The beam 10A is transmitted towards the reference arm of the interferometer 11 formed by the beam splitter 15 and a reference mirror 12. The reference mirror 12 reflects the beam 10A and sends it back towards the beam splitter 15. The beam 10B is transmitted towards the object arm of the interferometer 11 formed by the beam splitter 15, a lens 13 and a mirror 14. The lens 13 focuses the beam 10B on the mirror 14 and the mirror 14 sends the beam 10B back towards the lens 13. In FIG. 1, arrows are represented on the beam 10B in order to illustrate the turning over of the elements of the beam 10B. As a matter of fact, the lens orientates a beam element F1 towards the mirror in the form of a beam element F2. This beam element F2 is then reflected according to well known reflection laws in a beam element F3. This beam element F3 is transformed into a beam element F4 under the effect of the lens 13. It should thus be understood that an image having the intensity represented by the beam 10B is turned over after the passage thereof through the optical system composed by the lens 13 and the mirror 14. This effect will be described in further details in the following.

The light beams emitted by the reference arms and the object arm of the interferometer 11 interfere at the output of the beam splitter 15 in the form of a beam 17. This interference beam 17 is directed towards a tube lens 5 constructed to direct the beam 17 towards a confocal hole 6 positioned in front of a photodiode 7. The photodiode 7 enables intensity measurement on the beam 17, FIGS. 2 to 4 illustrates the turning over of an image under the effect of the interferometer 11 according to the invention.

Figure 2:
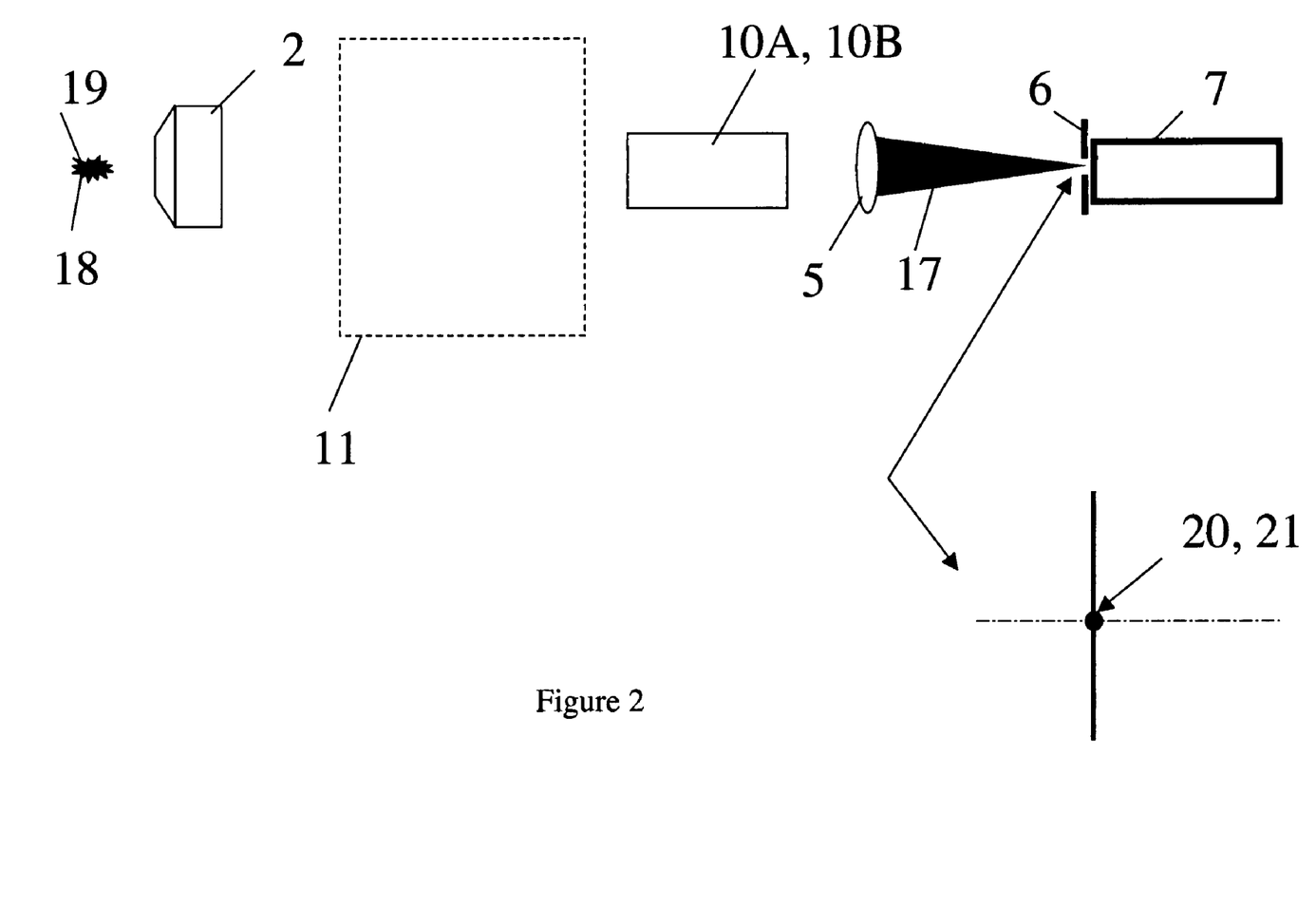
FIGS. 2 to 4 illustrate the generation of two images from the same light source symmetrical relative to the image focus of a tube lens in a confocal microscope according to the invention.

As illustrated in FIG. 2, when a fluorescent particle 18 is perfectly positioned at the focus 19 of the objective 2, the images generated by the two arms of the interferometer 11 are identical and correspond to identical beams 10A and 10B. In this case, the object of the interferometer 11 generates an image 21 of the light source 18 which can be superimposed with the image 20 created by the reference arm.

Figure 3:
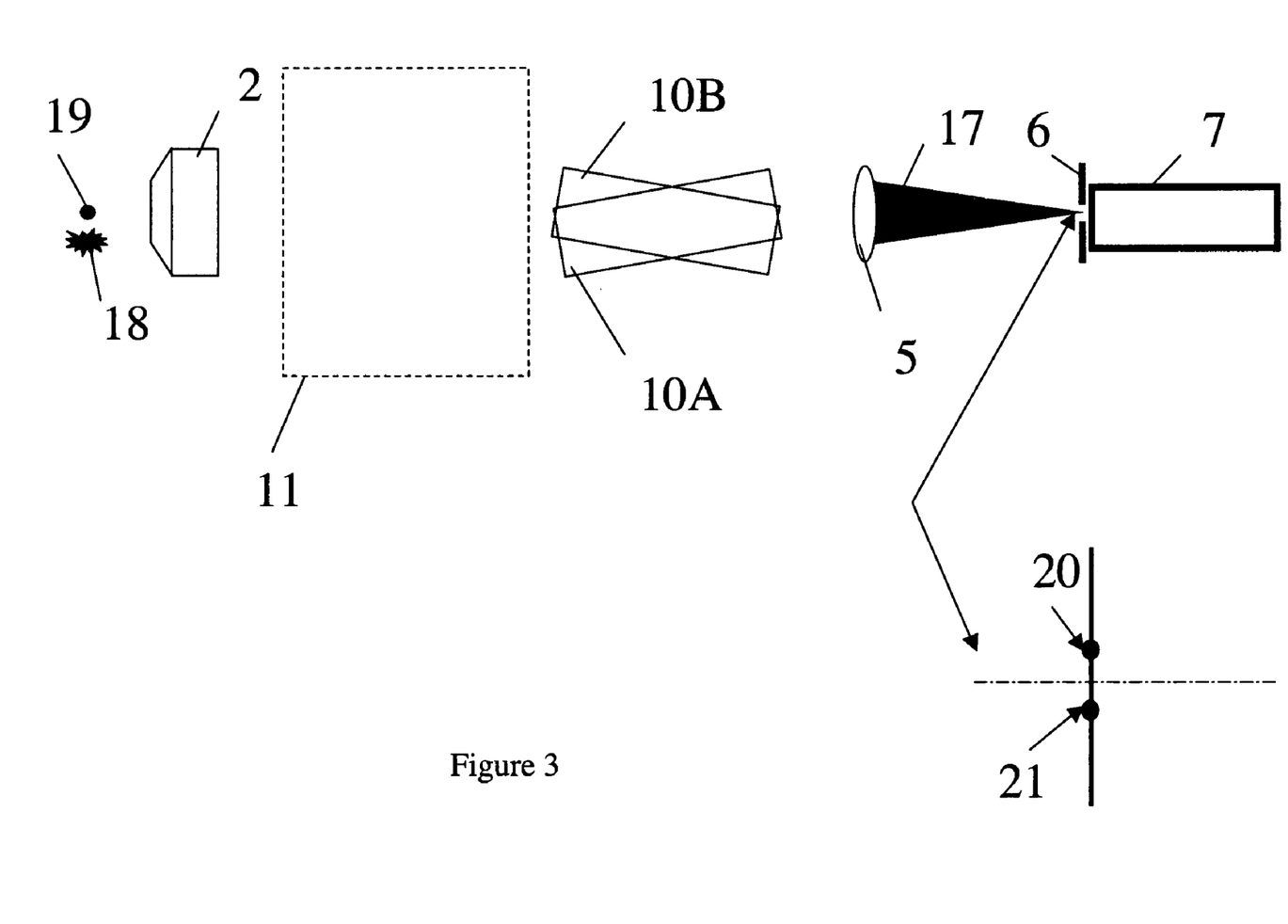
Figure 4:
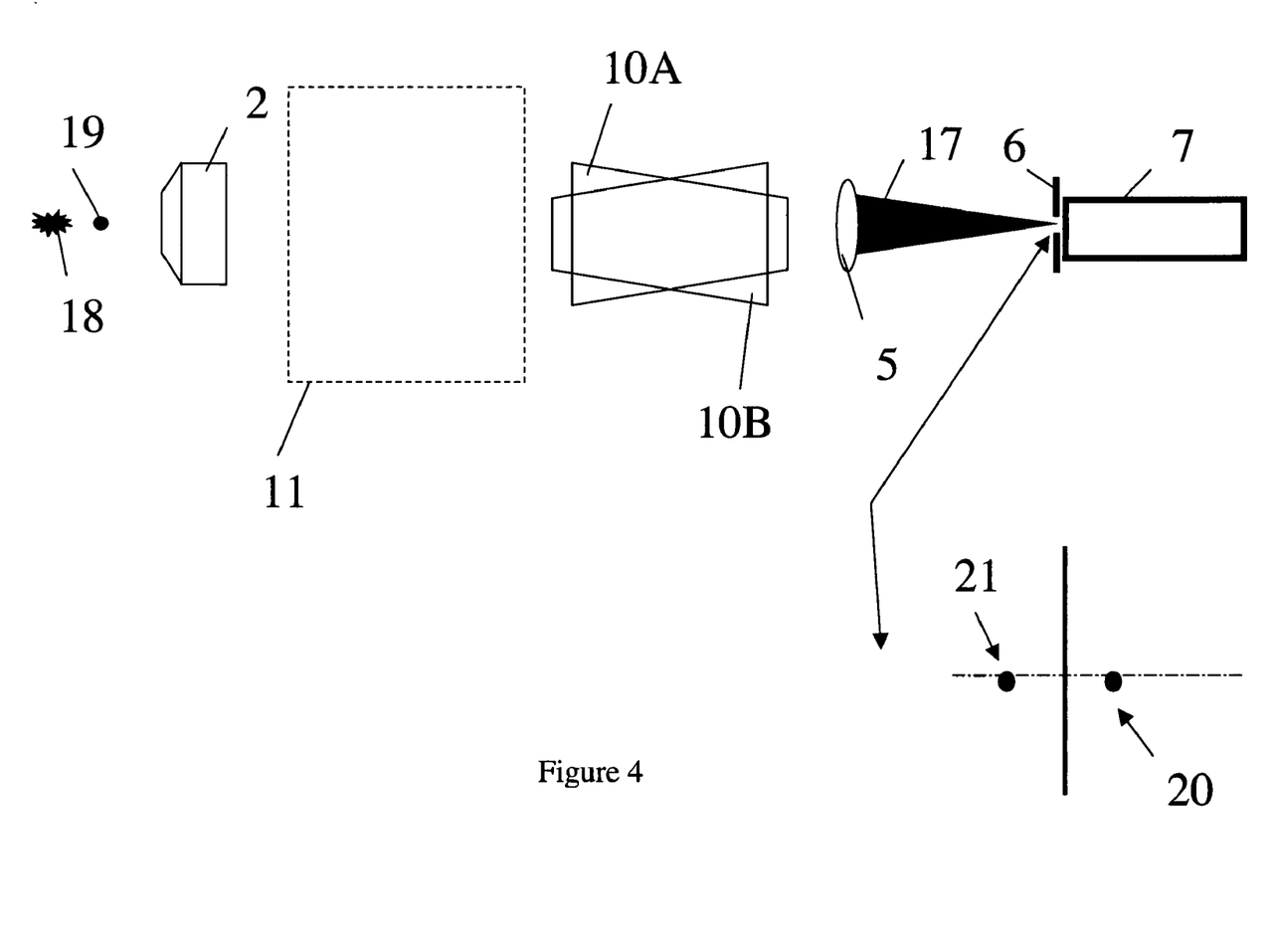

As illustrated in FIG. 3, when a fluorescent particle 18 is shifted relative to the focus 19 of the objective 2 in a lateral direction, i.e. in the focal plane of the objective 2, the interferometer 11 generates two different beams 10A and 10B. The reference arm comprising the reference mirror 12 and the beam splitter 15 generates a beam 10A having an orientation which is different from the beam 10B generated by the object arm composed of the lens 13, the mirror 14 and the beam splitter 15. In accordance with the optics laws, the object arm of the interferometer 11 generates an image 21 which is symmetrical to the image 20 relative to the focus of the tube lens 5.

Thus, the two images of the real source 18 do not interfere, from a constructional point of view, at the level of the confocal hole 6 prior to being detected by the photodiode 7. Thus, the effect of the light sources 18 which are laterally shifted relative to the focus 19 of the objective is substantially reduced relative to the sources located at the focus 19 of the objective 2. This provides a good side resolution of the confocal microscope 16 according to the invention.

Similarly, as illustrated in FIG. 4, when a fluorescent particle 18 is shifted from the focus 19 of the objective 2 in an axial direction, i.e. along the optic axis of the objective 2, the interferometer 11, generates two different beams 10A and 10B. The object arm of the interferometer 11 generates an image 21 which is symmetrical with the image 20 relative to the focus of the tube lens 5.

The two images of the real source 18 do not interfere, from a constructional point of view, at the level of the confocal hole 6 prior to the detection by the photodiode 7. Thus, the effect of the light sources 18 which are axially shifted from the focus 19 is substantially reduced relative to the sources located at the focus 19 of the objective 2. This also provides a good axial resolution of the confocal microscope 16 according to the invention.

Figure 5A:
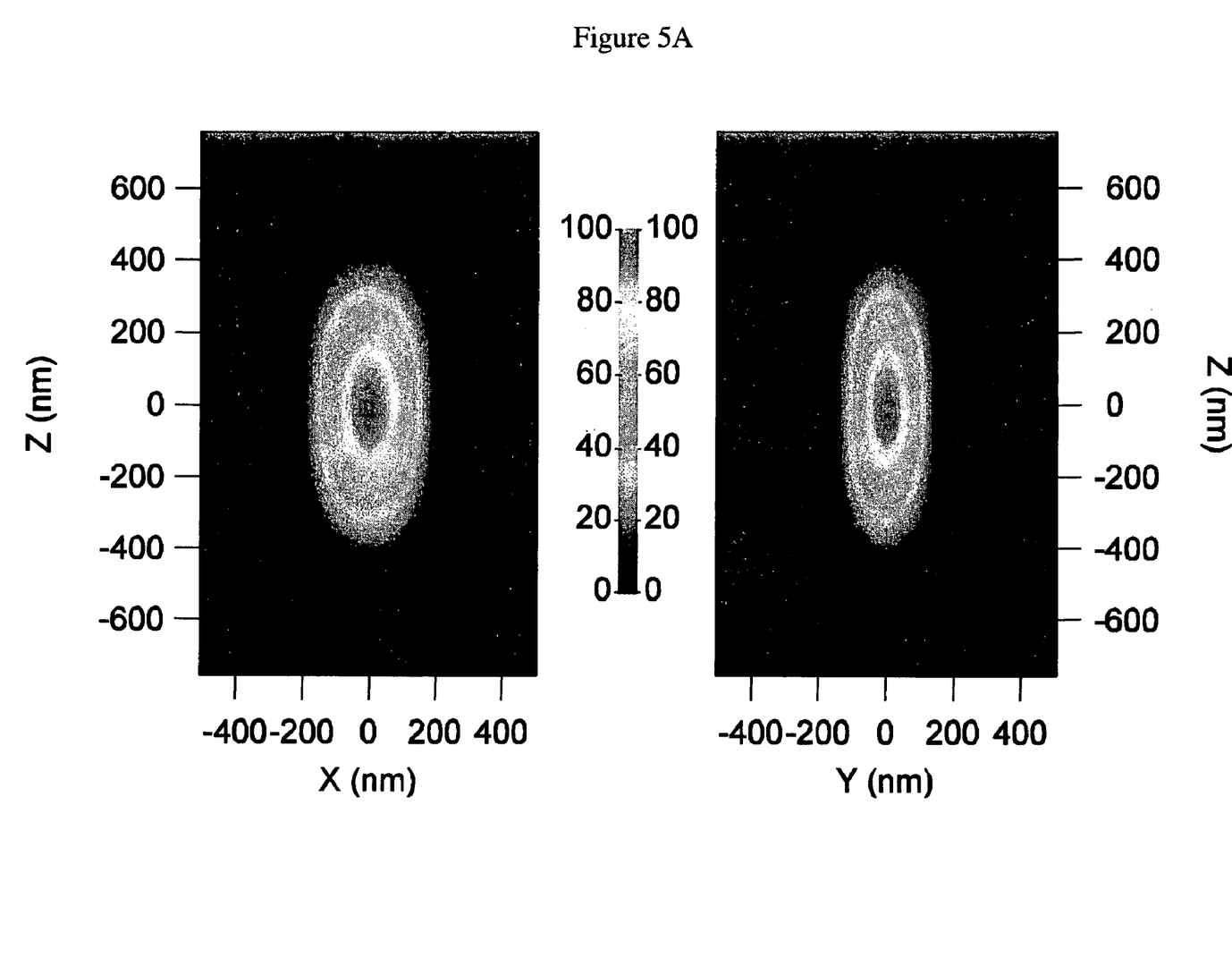
FIGS. 5A to 5C illustrate the spatial resolutions respectively for a confocal microscope without an interferometer, for a 4π-microscope and for a confocal microscope according to the invention.
Figure 5B:
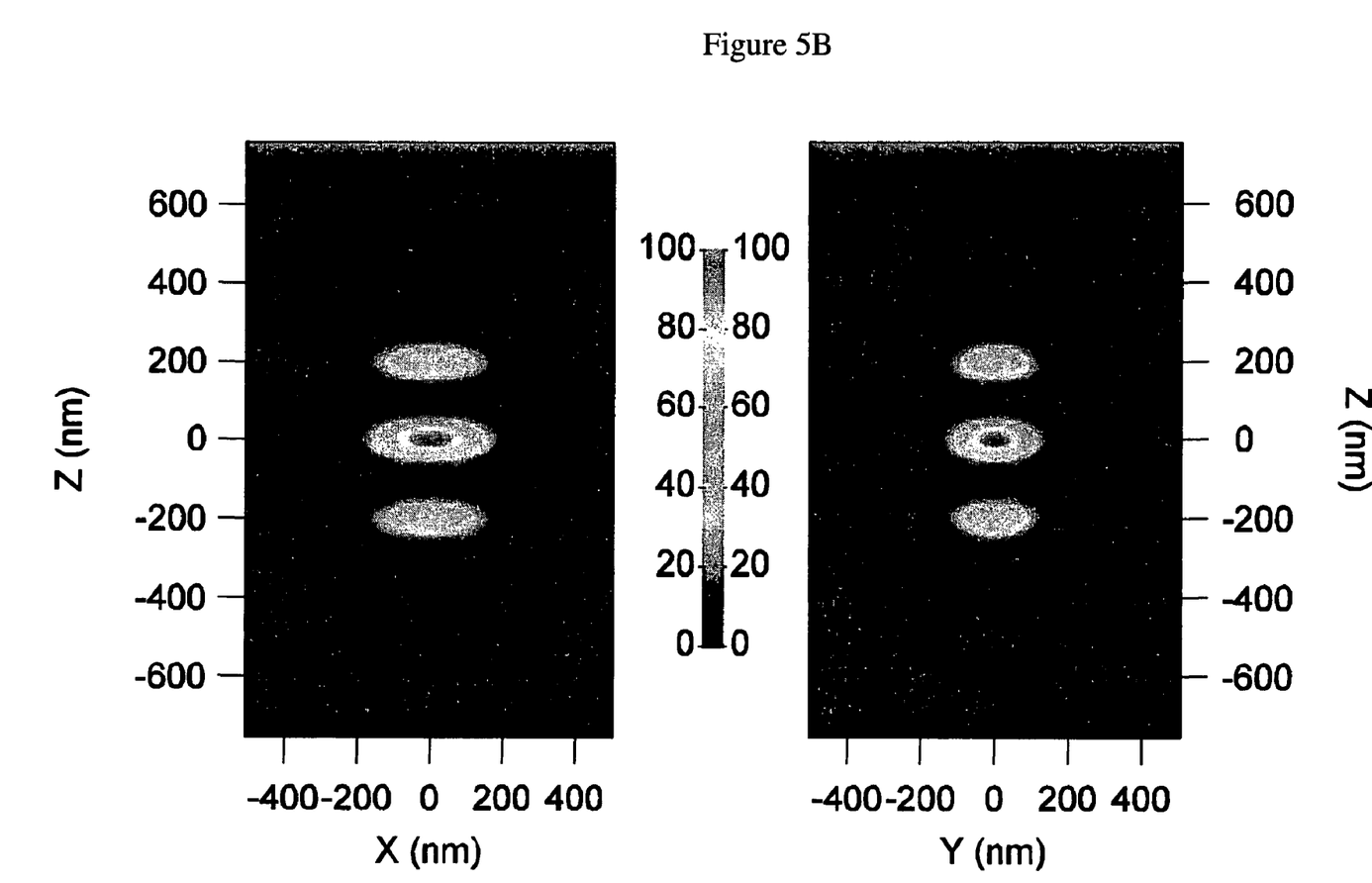
Figure 5C:
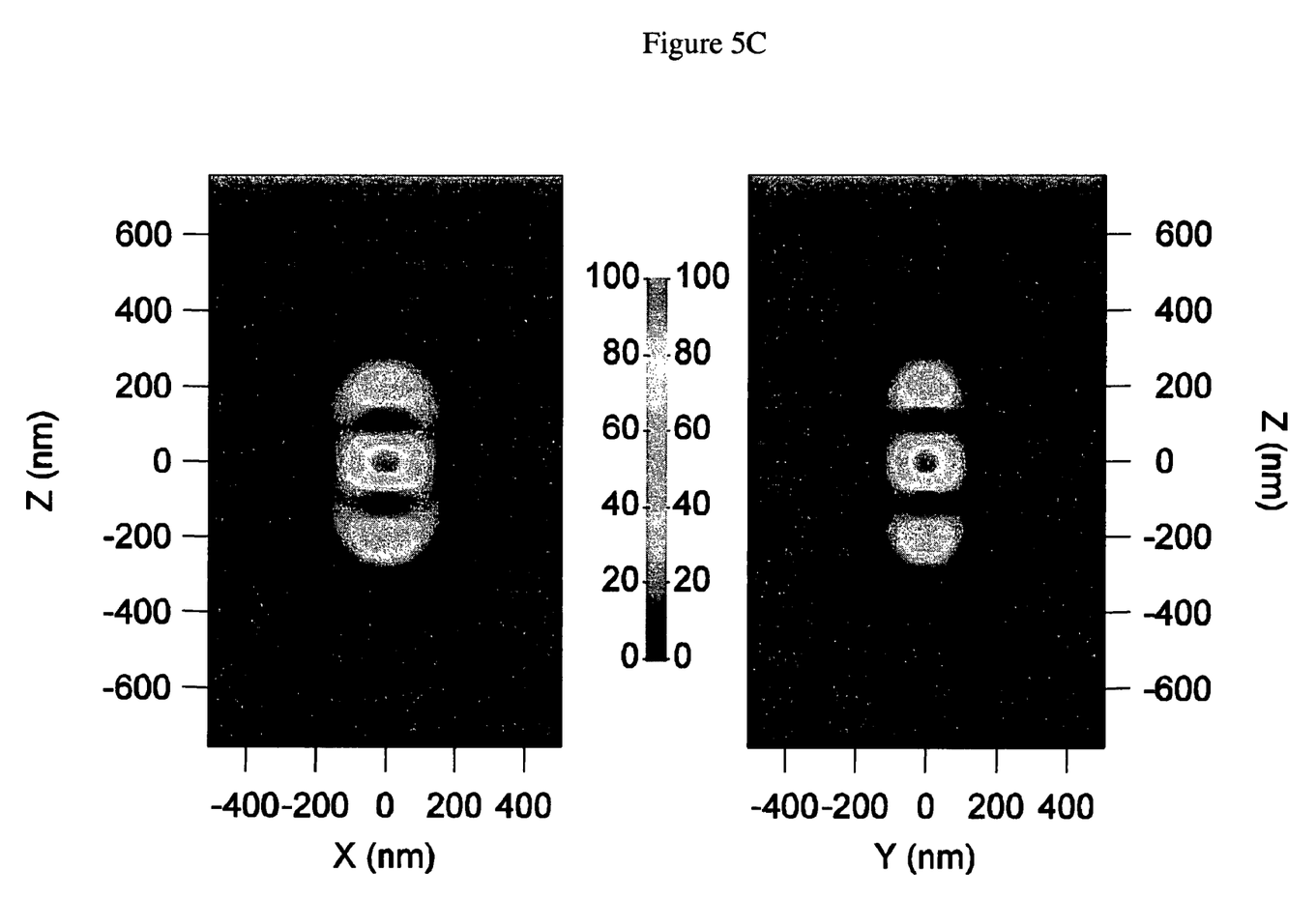

FIGS. 5A to 5C represent sections of observation volumes obtained from various types of confocal microscopes and more particularly the confocal microscope according to the invention as shown in FIG. 5C.

FIG. 5A represents the resolution obtained in the lateral x, y and axial directions z for a microscope of the known type including no interferometer, with a fluorescence wavelength of 525 nanometers for a laser excitation wavelength of 488 nanometers, a digital opening of the objective 2 of 1.3, a magnification of 40 and a diameter of the confocal hole of 20 micrometers.

FIG. 5B represents the resolution obtained in the side x, y and axial directions z for the $4\pi$-microscope with a fluorescence wavelength of 525 nanometers for a laser excitation wavelength of 488 nanometers, a digital opening of the objective 2 of 1.3, a magnification of 40 and a diameter of the confocal hole of 20 micrometers. It should be noted that the axial resolution is better than for FIG. 5A.

FIG. 5C represents a resolution obtained in the lateral x, y and axial directions z for a confocal microscope according to the invention having a fluorescence wavelength of 525 nanometers for a laser excitation wavelength of 488 nanometers, a digital opening of the objective 2 of 1.3, a magnification of 40 and a diameter of the confocal hole of 20 micrometers. It should be noted that the axial resolution is better than in FIG. 5A and that the side resolution is better than that of the $4\pi$-microscope illustrated in FIG. 5B. It should be noted that the processing of the image obtained by the photodiode 7 enable to improve again the resolution, more particularly because the intensity area are obtained and are clearly visible as can be seen in FIG. 5C.

Thus, the function of an efficient detection of a molecule, commonly called MDEF, and corresponding to the observation volume is improved by the confocal microscope according to the invention.

In addition, the interferometer 11 can be positioned on any type of confocal microscope including in one of the arms of a $4\pi$-microscope in order to improve the side resolution of such microscopes.

In addition, the invention makes it possible to obtain a good axial resolution while preventing the utilisation of a $4\pi$-microscope which has the above-mentioned drawbacks and more particularly the impossibility of using diffusing and thick objects. In this case, a microscope according to the invention has a single objective 2 associated to an interferometer 11, as can be seen in FIG. 1.

Alternate solutions of the invention can be found hereinunder.

Figure 6:
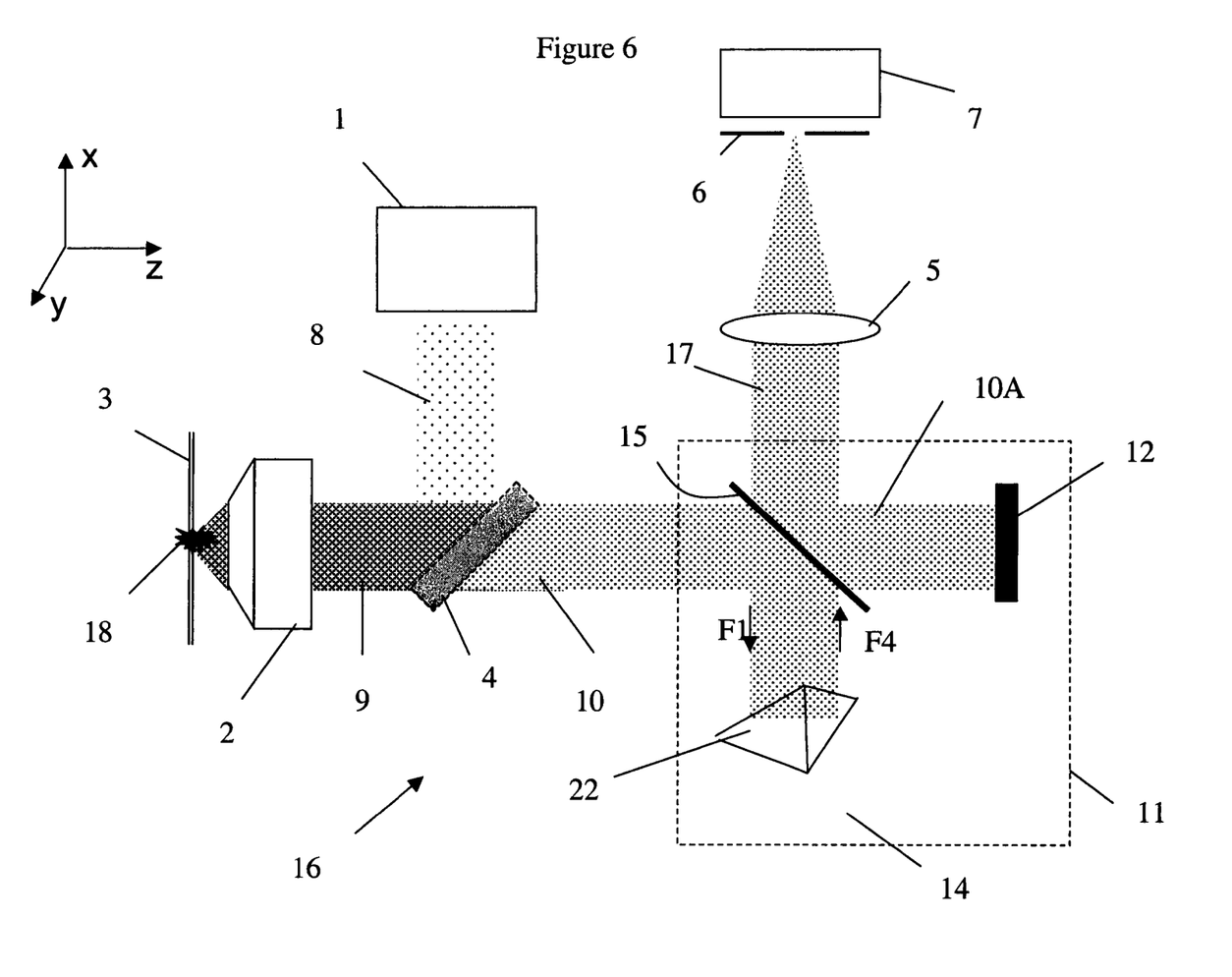
FIG. 6 illustrates another embodiment of the invention.

In order to have the interferometer 11 generate two images of the light source which are symmetrical relative to the image focus of the tube lens 5, an object arm has been described which includes a lens 13 and a mirror 14. According to an alternative solution of the invention as illustrated in FIG. 6, such elements are substituted with a cube corner 22. In a way known per se, this cube corner 22 also generates a virtual source having an image, the two images of the light source being symmetrical relative to the image focus of the tube lens 5. This is for example illustrated by arrows F1 and F4 which show the turning over of the incident image on the cube corner as for the system including the lens 13 and the mirror 14. The effect of the cube corner is thus equivalent to that of an association of the lens 13 and the mirror 14 and more particularly the mechanism illustrated in FIGS. 3 and 4 can be applied to an interferometer 11 comprising such cube corner 22.

In addition, according to another alternative solution of the invention, the confocal hole 6 can be omitted. As a matter of fact, the confocal effect is guaranteed by the interferences generated within the scope of the invention. In this case, the photodiode 7 of FIG. 1 directly receives the interfering beams.

The invention claimed is:

1. A confocal microscope for imaging a sample comprising at least a light source arranged between at least one objective and an interference means, said microscope comprising a tube lens with an image focus, wherein said interference means is arranged between the at least one objective and the tube lens and is configured to generate interference figures from said light source,
   wherein said interference means comprise first image generation means constructed to generate a first image of said light source, second image generation means constructed to generate a second image of said light source symmetrical to the first image relative to the image focus, image interference means constructed to make said first image and said second image interfere.

2. A confocal microscope according to claim 1, wherein said at least one objective has an optical axis, said light source having an axial component along said optical axis and a side component perpendicular to said optical axis, and wherein said first image generation means are constructed to generate a first side image of said side component, said second image generation means are constructed to generate a second side image of said side component, said first side image and said second side image being symmetrical relative to said image focus, said image interference means being constructed to make said first side image and said second side image interfere.

3. A confocal microscope according to claim 1 or 2, wherein said light source is able to generate a light beam having at least one light path between said at least one objective and said tube lens, wherein said interference means are positioned between said objective and said tube lens on said light path.

4. A confocal microscope according to claim 1, wherein the second image generation means comprise a reflection optical system, the reflection optical system being constructed to reflect the first image so as to generate the second image of said light source symmetrical to said first image relative to the image focus.

5. A confocal microscope according to claim 4, wherein the reflection optical system has an optical axis and is constructed to turn over the first image so as to generate the second image symmetrical to the first image relative to the image focus.

6. A confocal microscope according to claim 4 or 5, wherein the interference means include at least two interference arms, and wherein the reflection optical system is placed in one of the interference arms.

7. A confocal microscope according to one of claims 4 or 5, wherein said interference means comprise a first reference arm formed with a beam splitter and a reference mirror, and a second object arm formed with said beam splitter and the reflection optical system.

8. A confocal microscope according to claim 4, wherein said reflection optical system comprises an interferometer lens and an object mirror.

9. A confocal microscope according to claim 4, wherein said reflection optical system comprises a cube corner.

10. A confocal microscope according to claim 7, wherein said first image generation means comprise said reference mirror and said tube lens, said second image generation means comprise said reflection optical system and said tube lens, and said image interference means comprise said beam splitter.

11. A confocal microscope according to claim 1 comprising a pump beam, said light source being composed of at least one fluorescent particle excited by said pump beam in an excitation area spatially focused at the output of said objective, said excited fluorescent particle being able to generate a fluorescence, said confocal microscope comprising splitter means constructed to splitter said pump beam and said fluorescence.

12. A confocal microscope according to claim 1 comprising a single objective.

13. A confocal method for imaging a light source from at least one objective and one tube lens having an image focus, wherein said light source is arranged between the at least one objective and an interference means and said interference means is arranged between the objective and the tube lens, said method comprising a step of generation of interference consisting in generating interference figures from said light source, wherein said step of interference generation comprises sub-steps consisting in:
   generating a first image of said light source;
   generating a second image of said light source symmetrical to the first image relative to said image focus;
   making said first image and said second image interfere.

14. A method according to claim 13, wherein said at least one objective has an optical axis, said light source having an axial component along said optical axis and a side component perpendicular to said optical axis and wherein said step of generating interference comprises sub-steps consisting in:
   generating a first side image of said side component,
   generating a second side image of said side component,
   said first side image and said second side image being symmetrical relative to said image focus,
   making said first side image and said second side image interfere.

* * * * *